US012001163B2

(12) United States Patent
Takahashi

(10) Patent No.: US 12,001,163 B2
(45) Date of Patent: Jun. 4, 2024

(54) TONER CARTRIDGE INCLUDING VENTILATION PORT PLUG REMOVABLE THROUGH A PADDLE GEAR THROUGH HOLE

(71) Applicant: Toshiba Tec Kabushiki Kaisha, Tokyo (JP)

(72) Inventor: Nobuaki Takahashi, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/157,650

(22) Filed: Jan. 20, 2023

(65) Prior Publication Data

US 2023/0367254 A1 Nov. 16, 2023

(30) Foreign Application Priority Data

May 16, 2022 (JP) ................................ 2022-080341

(51) Int. Cl.

*G03G 21/00* (2006.01)
*G03G 15/08* (2006.01)
*G03G 21/16* (2006.01)

(52) U.S. Cl.

CPC ..... *G03G 21/0052* (2013.01); *G03G 15/0822* (2013.01); *G03G 15/087* (2013.01); *G03G 15/0894* (2013.01); *G03G 21/0029* (2013.01); *G03G 21/1642* (2013.01)

(58) Field of Classification Search

CPC ............ G03G 15/0894; G03G 15/087; G03G 15/0822; G03G 21/1642; G03G 21/16; G03G 21/206

See application file for complete search history.

(56) References Cited

U.S. PATENT DOCUMENTS 5,539,503 A * 7/1996 Johnson .............. G03G 15/104 396/626
6,029,035 A * 2/2000 Akichika .............. G03G 15/10 399/237
7,574,148 B2 * 8/2009 Igarashi .............. G03G 15/556 399/12

(Continued)

FOREIGN PATENT DOCUMENTS

JP H07306576 A 11/1995
JP 2007024958 A 2/2007

*Primary Examiner* — Arlene Heredia
(74) *Attorney, Agent, or Firm* — Kim & Stewart LLP

(57) ABSTRACT

A toner cartridge for storing toner to be supplied to an image forming apparatus, includes a container in which the toner is stored and including a first wall having a filling port through which the toner is filled, and a second wall having a ventilation port sealable by a plug, the plug sealing the port during operation of the cartridge and is removed during maintenance of the cartridge to enable air to be supplied into the container through the port, a paddle configured to rotate to stir the toner between the first and second walls of the container, and a paddle gear connected to the paddle and through which a rotation force is transmitted to the paddle. The gear has a through hole that aligns with the ventilation port in a first direction parallel to a rotation axis of the gear when the gear is at a predetermined rotational position.

20 Claims, 8 Drawing Sheets

(56) References Cited

U.S. PATENT DOCUMENTS

| | | | | |
|---|---|---|---|---|
| 7,962,069 | B2 * | 6/2011 | Kurenuma | G03G 15/0879<br>399/258 |
| 9,348,260 | B2 * | 5/2016 | Eto | G03G 15/0893 |
| 2007/0231017 | A1 | 10/2007 | Sato | |
| 2009/0060589 | A1 * | 3/2009 | Tanaka | G03G 15/0875<br>399/263 |
| 2012/0213555 | A1 * | 8/2012 | Komatsu | G03G 15/087<br>399/262 |
| 2013/0170861 | A1 * | 7/2013 | Buchanan | G03G 15/0875<br>399/258 |
| 2014/0079441 | A1 * | 3/2014 | Abler | G03G 15/0877<br>399/262 |
| 2014/0241757 | A1 * | 8/2014 | Kikuchi | G03G 15/0886<br>399/258 |
| 2016/0033897 | A1 * | 2/2016 | Eto | G03G 15/0893<br>399/262 |
| 2023/0408952 | A1 * | 12/2023 | Watanabe | G03G 15/0894 |

* cited by examiner

TONER CARTRIDGE INCLUDING VENTILATION PORT PLUG REMOVABLE THROUGH A PADDLE GEAR THROUGH HOLE

CROSS-REFERENCE TO RELATED APPLICATION(S)

This application is based upon and claims the benefit of priority from Japanese Patent Application No. 2022-080341, filed May 16, 2022, the entire contents of which are incorporated herein by reference.

FIELD

Embodiments described herein relate generally to a toner cartridge and an image forming apparatus.

BACKGROUND

A toner cartridge is mounted on and used in an image forming apparatus such as a digital multifunction peripheral (MFP). The toner stored in the toner cartridge is supplied to a developing device of the image forming apparatus. After the toner is exhausted, the toner cartridge is removed from the image forming apparatus and reused. Before the toner cartridge is reused, the toner remaining in the toner cartridge is cleaned.

When the toner is filled into the toner cartridge, the toner is filled from a filling port provided at one end of the toner cartridge in the longitudinal direction. After the toner is filled, the filling port is sealed with a cap. On the other hand, when the residual toner in the toner cartridge is cleaned for reuse, for example, the cap of the filling port is removed, and air is sucked from the filling port, and the outside air is taken into the toner cartridge from a ventilation port provided on the opposite end in the longitudinal direction.

After the cleaning of the toner cartridge, the ventilation port is sealed with a plug, and the toner is filled from the filling port.

Since such a plug to be opened for cleaning is detachable from the ventilation port, there is a possibility that the plug is inadvertently removed from the toner cartridge by a user.

SUMMARY OF THE INVENTION

Embodiments of the present invention provide a toner cartridge capable of preventing a plug of a ventilation port for cleaning from being inadvertently opened.

A toner cartridge for storing toner to be supplied to an image forming apparatus, includes a container in which the toner is stored and including a first wall having a filling port through which the toner can be filled, and a second wall having a ventilation port that is sealable by a plug. The plug seals the ventilation port during operation of the toner cartridge and is removed during maintenance of the toner cartridge to enable air to be supplied into the container through the ventilation port. The toner cartridge further includes a paddle configured to rotate to stir the toner between the first and second walls of the container and a paddle gear connected to the paddle and through which a rotation force is transmitted to the paddle. The paddle gear has a through hole that aligns with the ventilation port in a first direction parallel to a rotation axis of the paddle gear when the paddle gear is at a predetermined rotational position.

DETAILED DESCRIPTION

Hereinafter, embodiments will be described in detail with reference to the drawings.

Figure 1:
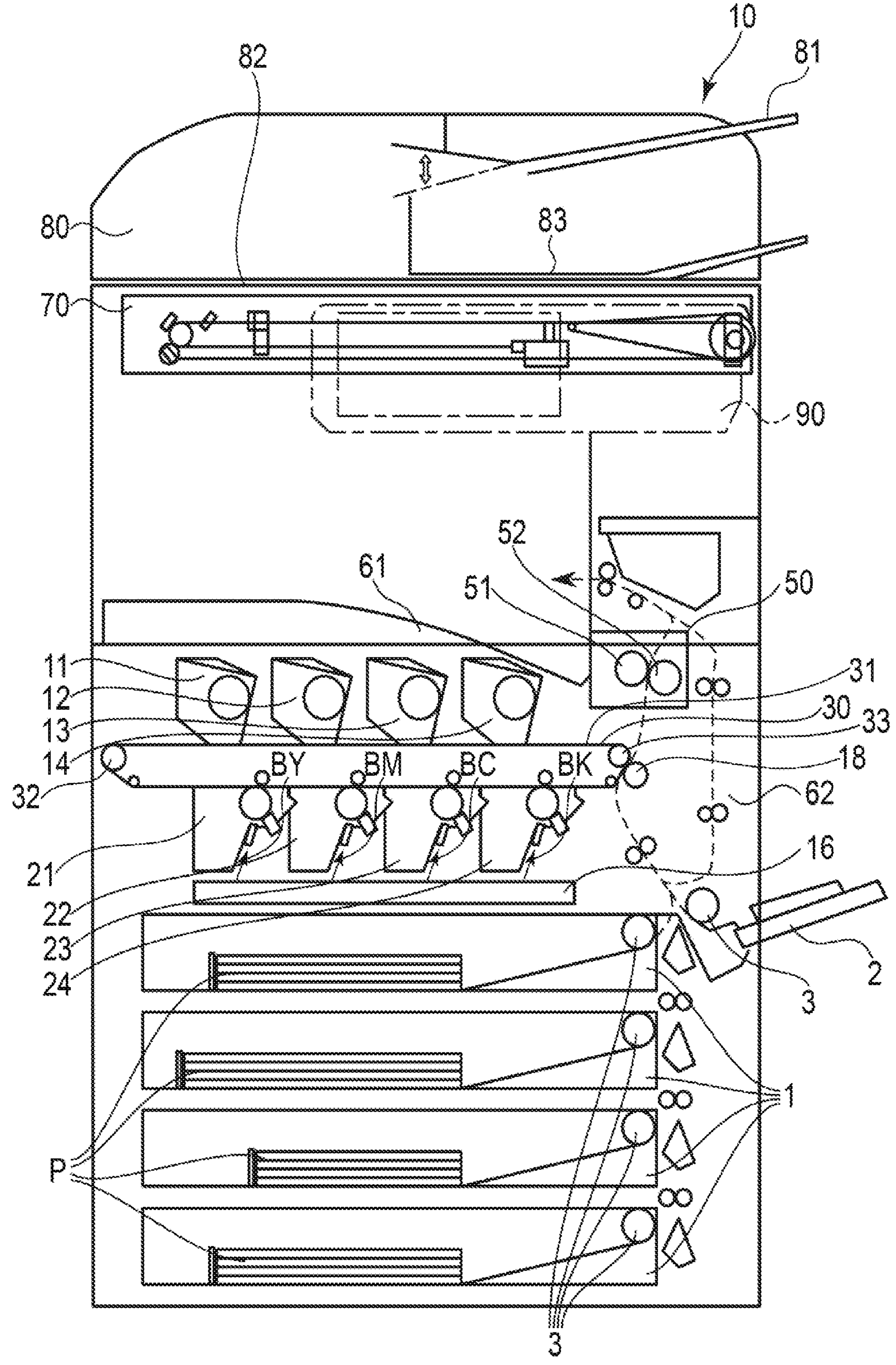
FIG. 1 is a schematic diagram illustrating a digital multifunction peripheral.

FIG. 1 illustrates a digital multifunction peripheral 10 in one embodiment, which is an example of an image forming apparatus. The digital multifunction peripheral 10 has many functions such as a printing function, a scanning function, a copying function, and a facsimile function. The printing function is a function of forming a toner image on a sheet. The scanning function is a function of reading an image from a document. The copying function is a function of printing the image read from a document using a scanning function on a sheet P using the printing function. The facsimile function is a function of printing an image based on data received using a communication line on a sheet P using the printing function, or transmitting image data read from a document using the scanning function via the communication line.

The digital multifunction peripheral 10 includes a plurality of sheet feed cassettes 1, a manual feed tray 2, and a plurality of sheet feed rollers 3. The sheet feed cassette 1 stores a plurality of sheets P used for printing. The manual feed tray 2 is used for manual feed in a state in which a plurality of sheets P are stacked. The sheet feed roller 3 takes out the sheets P stored in the sheet feed cassette 1 or placed on the manual feed tray 2 one by one.

The digital multifunction peripheral 10 includes a plurality of toner cartridges 11, 12, 13, and 14, a plurality of image forming units 21, 22, 23, and 24, an exposure device 16, a transfer belt unit 30, and a secondary transfer roller 18. The digital multifunction peripheral 10 includes the plurality of toner cartridges 11, 12, 13, and 14 above the transfer belt unit 30, and the plurality of image forming units 21, 22, 23, and 24 below the transfer belt unit 30.

The toner cartridges 11, 12, 13, and 14 contain toners of respective colors to be supplied to the image forming units 21, 22, 23, and 24. The left-most toner cartridge 11 in FIG. 1 contains yellow toner. The second toner cartridge 12 from the left contains toner of magenta. The third toner cartridge 13 contains cyan toner. The rightmost toner cartridge 14 contains black toner.

The toner cartridges 11, 12, 13, and 14 are detachable from the digital multifunction peripheral 10. The toner cartridges 11, 12, 13, and 14 have substantially the same structure except for the difference in the contained toner. Hereinafter, the toner cartridge 11 that contains yellow toner is mainly described, and the descriptions of the toner cartridges 12, 13, and 14 of the other colors will be omitted. The toner cartridge 11 will be described in detail later.

The image forming units 21, 22, 23, and 24 receive toner supplied from the toner cartridges 11, 12, 13, and 14, respectively, to form toner images of different colors. The leftmost image forming unit 21 in FIG. 1 forms a yellow (Y) toner image. The second image forming unit 22 from the left forms a toner image of magenta (M) color. The third image forming unit 23 from the left forms a cyan (C) toner image. The rightmost image forming unit 24 forms a black (K) toner image.

The image forming units 21, 22, 23, and 24 have substantially the same structure except for the difference in toner. Hereinafter, the yellow image forming unit 21 will be described as a representative, and the descriptions of the other color image forming units 22, 23, and 24 will be omitted.

Figure 2:
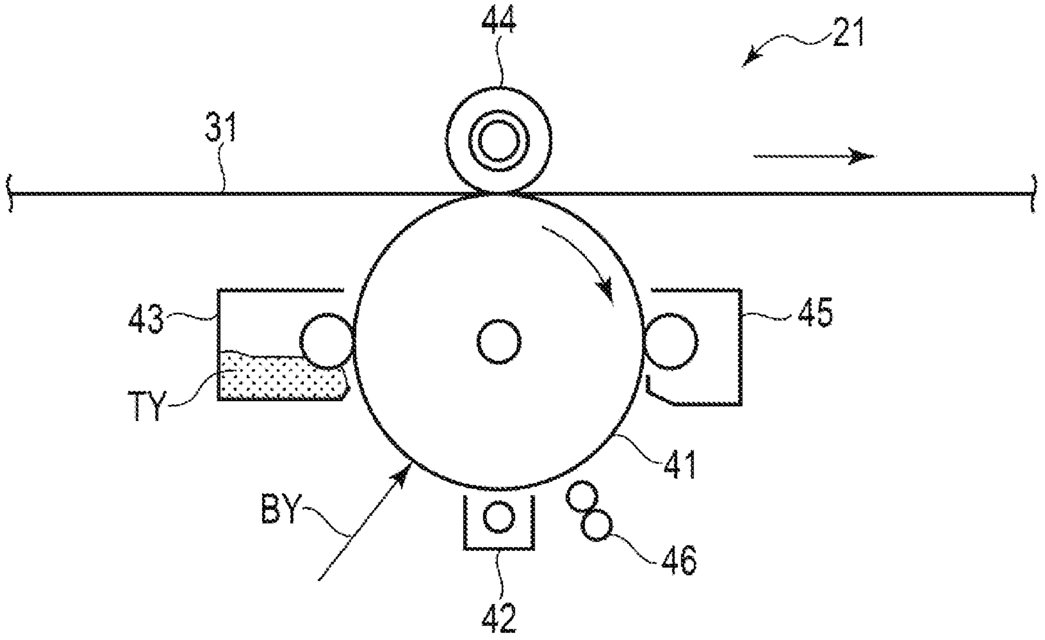
FIG. 2 is a schematic diagram illustrating an image forming unit of the digital multifunction peripheral.

As illustrated in FIG. 2, the image forming unit 21 that forms a yellow toner image includes a photoconductor drum 41, a charging unit 42, a developing device 43, a primary transfer roller 44, a cleaner 45, and a charge eliminating lamp 46. The image forming unit 21 includes the charging unit 42, the developing device 43, the primary transfer roller 44, the cleaner 45, and the charge eliminating lamp 46 arranged in this order in the rotation direction of the photoconductor drum 41 (i.e., the arrow direction inside the photoconductor drum 41 in FIG. 2) and facing the surface of the photoconductor drum 41.

The photoconductor drum 41 has a cylindrical surface that receives a light beam BY emitted from the exposure device 16. The light beam BY is emitted based on yellow image data obtained by color-separating image data read from a document by a scanner 70, which will be described later, or image data inputted from the outside of the digital multifunction peripheral 10. The exposure device 16 exposes and scans the surface of the photoconductor drum 41 with the light beam BY as the photoconductor drum 41 rotates, and forms an electrostatic latent image on the surface of the photoconductor drum 41 based on the yellow image data.

The charging unit 42 charges the surface of the photoconductor drum 41 before exposure to a predetermined potential. The developing device 43 develops the electrostatic latent image on the surface of the photoconductor drum 41 by the yellow toner TY supplied from the toner cartridge 11. That is, the developing device 43 supplies yellow toner to the surface of the photoconductor drum 41 to form a yellow toner image.

The primary transfer roller 44 faces the surface of the photoconductor drum 41 with the transfer belt 31 of the transfer belt unit 30 interposed therebetween. The primary transfer roller 44 generates a transfer voltage between itself and the photoconductor drum 41. By this transfer voltage, the primary transfer roller 44 transfers the yellow toner image formed on the surface of the photoconductor drum 41 to the surface of the transfer belt 31 in contact with the photoconductor drum 41, which is referred to as primary transfer.

The cleaner 45 removes the yellow toner TY remaining on the photoconductor drum 41. The charge elimination lamp 46 removes the charge remaining on the surface of the photoconductor drum 41.

The exposure device 16 illustrated in FIG. 1 irradiates the photoreceptor drums 41 of the image forming units 21, 22, 23, and 24 with light-beams BY, BM, BC, BK of respective colors in accordance with the color-separated image data of the respective colors. The light-beams BY, BM, BC, BK of the respective colors are for forming yellow, magenta, cyan, and black images, respectively.

For example, the exposure device 16 emits the yellow light beam BY in accordance with the yellow image data to form a yellow electrostatic latent image on the surface of the photoconductor drum 41 of the image forming unit 21. Similarly, the exposure device 16 emits the light-beams BM, BC, BK of three colors in accordance with the magenta color component, the cyan color component, and the black color component of the image data to form electrostatic latent images for magenta, cyan, and black on the surfaces of the photosensitive drums 41 of the image forming units 22, 23, and 24, respectively.

The transfer belt unit 30 includes an endless transfer belt 31 and two rollers around which the transfer belt 31 is wound. These two rollers are a driven roller 32 and a drive roller 33. In addition, the transfer belt unit 30 includes a tension roller for applying tension to the transfer belt 31. By rotating the drive roller 33, the transfer belt 31 rotates. The transfer belt 31 rotates in the counterclockwise direction in FIG. 1 to convey the toner images of the respective colors transferred from the image forming units 21, 22, 23, and 24 to the secondary transfer roller 18.

The secondary transfer roller 18 faces the surface of the drive roller 33 with the transfer belt 31 interposed therebetween, and generates a transfer voltage with respect to the drive roller 33. Due to this transfer voltage, the secondary transfer roller 18 transfers each colored toner image superimposed on the surface of the transfer belt 31 into a sheet P (i.e., secondary transfer) that has been supplied from the sheet feed cassette 1 or manual feed tray 2 and transported between the transfer belt 31 and the secondary transcription roll 18.

The digital multifunction peripheral 10 also includes a fixing device 50. The fixing device 50 heats and pressurizes the sheet on which the toner images of the respective colors have been transferred. As a result, the toner images of the respective colors transferred to the sheet P are fixed to the sheet P. The fixing device 50 includes a heating roller 51 and a pressure roller 52 that face each other with the conveyance path of the sheet P interposed therebetween.

The heating roller 51 includes a heat source for heating the heating roller 51. The heat source is, for example, a heater. The heating roller 51 heated by the heat source heats the sheet P to the melting temperature of the toner. The pressing roller 52 presses the sheet P passing between the pressing roller 52 and the heating roller 51.

The digital multifunction peripheral 10 also includes a sheet discharge tray 61, a duplex unit 62, a scanner 70, a document feeder 80, and a control panel 90.

The sheet discharge tray 61 receives the sheet P discharged after the printing is completed. The duplex unit 62 brings the sheet P into a state in which printing on the back surface is possible. For example, the duplex unit 62 switches back the sheet P by using a roller or the like, thereby reversing the front and back sides of the sheet P and feeding the sheet P to the secondary transfer region between the transfer belt 31 and the secondary transfer roller 18.

The scanner 70 reads an image from a document. The scanner 70 reads an image by an optical reduction method including an image sensor such as an image sensor (CCD (charge-coupled device)), for example. Alternatively, the scanner 70 reads an image using a close contact sensor (CIS (contact image sensor)) method including an image sensor such as an image sensor (CMOS (complementary metal-oxide-semiconductor)).

The document feeder 80 is also referred to as, for example, an ADF (auto document feeder). The document feeder 80 takes out documents (not shown) placed on the tray 81 one by one, and conveys the documents one by one through a document glass 82. The scanner 70 reads an image of the document conveyed onto the document glass 82.

The control panel 90 includes buttons, a touch panel, and the like for an operator of the digital multifunction peripheral 10 to operate. The touch panel is, for example, a stack of a display such as a liquid crystal display or an organic EL display and a pointing device. Therefore, the button and the touch panel function as an input device that accepts an operation by the operator of the digital multifunction peripheral 10. The display of the touch panel functions as a display device that notifies the operator of the digital multifunction peripheral 10 of various kinds of information.

Hereinafter, the toner cartridge 11 will be described with reference to FIGS. 3 to 12.

Figure 3:
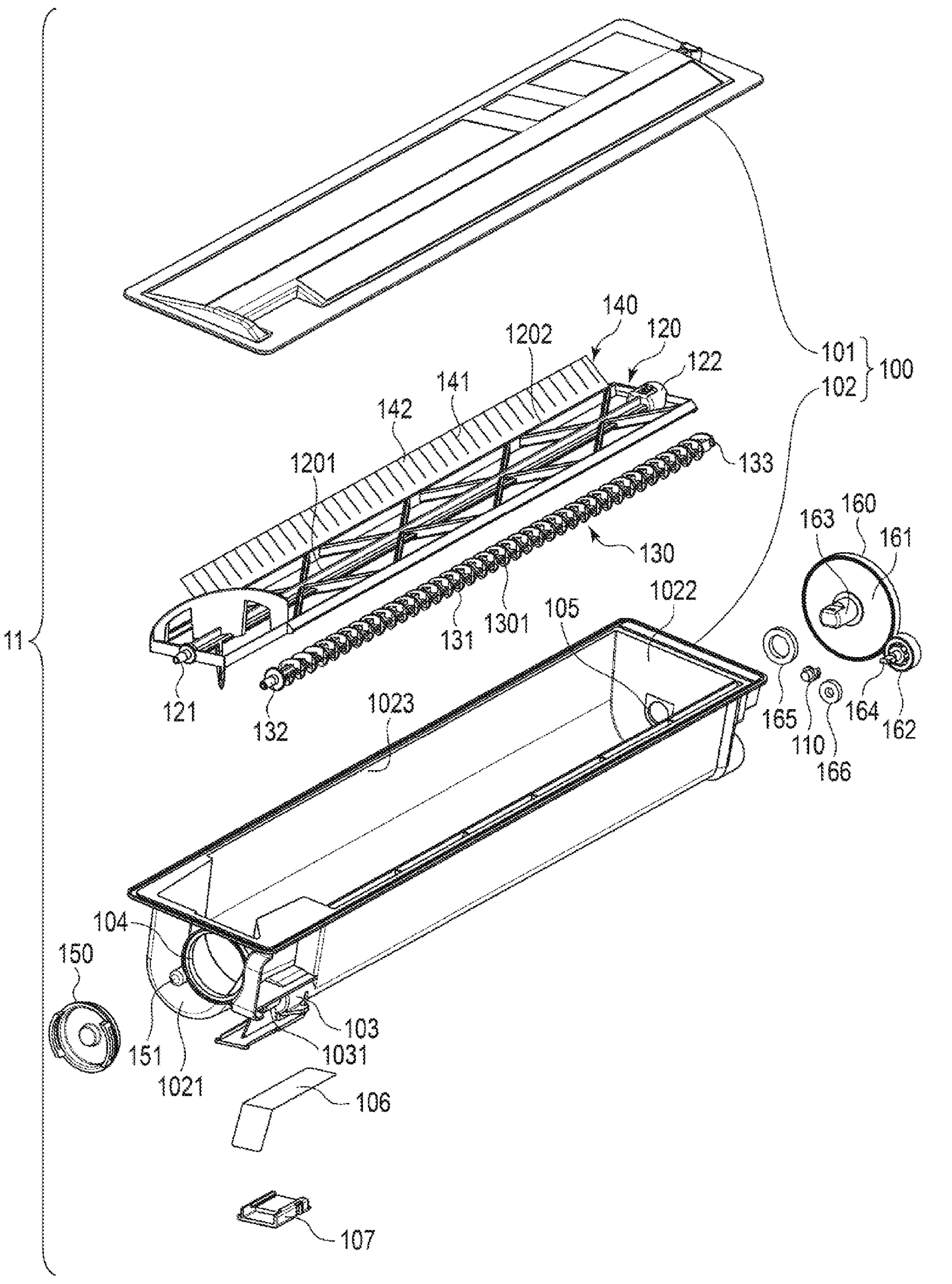
FIG. 3 is an exploded perspective view illustrating a toner cartridge according to an embodiment mounted on the digital multifunction peripheral.

As illustrated in FIG. 3, the toner cartridge 11 according to an embodiment includes a toner container 100, a paddle 120, an auger 130, and a scraping member 140. Further, the toner cartridge 11 has a plug 110 that closes a ventilation port 108 (see FIG. 8) provided in the toner container 100. In the following description, the terms indicating directions and postures such as "front-rear" and "horizontal" are based on a state of the toner cartridge 11 after it has been attached to the digital multifunction peripheral 10.

The toner container 100 includes a container body 102 and a lid body 101. The container body 102 has a substantially U-shape in a cross section perpendicular to the longitudinal direction thereof. The container body 102 has a front wall 1021 perpendicular to the longitudinal direction at the front end thereof in the longitudinal direction, and has a rear wall 1022 perpendicular to the longitudinal direction at the rear end thereof in the longitudinal direction. Further, the container body 102 has a substantially rectangular opening 1023 that opens upwardly. The lid body 101 closes the opening 1023 of the container body 102. The lid body 101 has an upwardly convex roof shape. The toner container 100 in which the container body 102 and the lid body 101 are joined together has a box shape elongated in the front-rear direction.

A supply unit 103 having a supply port (not shown) for supplying toner to the developing device 43 is provided in front of a bottom portion of the container body 102. The supply port is a substantially rectangular hole opened below the supply unit 103. The supply port is sealed by a sealing material 106. The sealing material 106 is removed from the supply port when the toner cartridge 11 is used. The supply unit 103 includes a shutter 107 capable of opening and closing the supply port. A bearing portion 1031 is provided in front of the supply unit 103 to rotatably receive a front end 132 of a rotation shaft 1301 of an auger 130, which will be described later.

The front wall 1021 of the container body 102 includes a filling port 104 for filling the toner container 100 with toner.

The filling port 104 is a circular hole. The filling port 104 is sealed by a cap 150 after the toner is filled. The rear wall 1022 of the container body 102 includes a ventilation port 108 (not shown). The ventilation port 108 is sealed by the plug 110. Each of the cap 150 and the plug 110 has a mechanism to be detachable from the container body 102.

The paddle 120 includes a rotation shaft 1201 and a stirring blade 1202. The stirring blade 1202 extends from the rotation shaft 1201 in a direction orthogonal to the rotation shaft 1201. The paddle 120 is disposed inside the toner container 100 in a posture in which the rotation shaft 1201 is aligned with the longitudinal direction of the toner container 100. The front end 121 of the rotation shaft 1201 is rotatably connected to a bearing portion 151 provided on the front wall 1021 of the container body 102 adjacent to the filling port 104. The rear end of the rotation shaft 1201 includes a coupling portion 122. The paddle 120 rotates counterclockwise when viewed from the front. The paddle 120 rotates to stir the toner contained in the toner container 100.

The auger 130 includes a rotation shaft 1301 and screw blades 131. The screw blade 131 extends spirally around the rotation shaft 1301. The auger 130 is disposed inside the toner container 100 in such a manner that the rotation shaft 1301 is adjacent to the paddle 120 along the longitudinal direction of the toner container 100. The front end portion of the auger 130 is disposed in the supply unit 103 of the toner container 100 above the supply port. The front end 132 of the rotation shaft 1301 is rotatably connected to the bearing portion 1031 provided in the supply unit 103. The rear end of the rotation shaft 1301 includes a coupling portion 133. The auger 130 rotates to convey the toner between the screw blades 131 to the supply unit 103.

The scraping member 140 is cantilevered on the opposite long side of the paddle 120 radially away from the axis of rotation 1201 of the stirring blade 1202. The scraping member 140 is an elastic rectangular sheet-like member. The scraping member 140 has substantially the same length as the stirring blade 1202 in the axial direction. The scraping member 140 has a plurality of slits 141 in a direction orthogonal to the rotation axis 1201. As the paddle 120 rotates, the free edge of the scraping member 140 opposite the stirring blade 1202 is pressed against and in sliding contact with the inner wall of the toner container 100. The scraping member 140 is curved with its free edge pressed against the inner wall of the toner container 100 (see FIG. 12). The scraping member 140 moves in contact with the bottom of the inner wall of the toner container 100 as the paddle 120 rotates. As a result, the scraping member 140 feeds the toner toward the auger 130.

The toner cartridge 11 includes a gear unit 160 facing the outside of the rear wall 1022 of the container body 102 of the toner container 100. The gear unit 160 includes a paddle gear 161 connected to the rotation shaft 1201 of the paddle 120 and an auger gear 162 connected to the rotation shaft 1301 of the auger 130. The gear on the outer periphery of the paddle gear 161 and the gear on the outer periphery of the auger gear 162 are meshed with each other. Therefore, the auger gear 162 rotates in accordance with the rotation of the paddle gear 161. That is, the auger 130 is interlocked with the paddle 120.

The paddle gear 161 has a coupling shaft 163 protruding forward. The coupling shaft 163 is at the center of rotation of the paddle gear 161. The rear wall 1022 of the container body 102 includes a bearing hole 105 (see FIG. 8) into which the coupling shaft 163 is rotatably inserted. The coupling shaft 163 is inserted into the bearing hole 105 in a state where a seal ring 165 is attached. The coupling shaft 163 is connected to the coupling portion 122 of the rotation shaft 1201 of the paddle 120.

The auger gear 162 has a coupling shaft 164 protruding forward. The coupling shaft 164 is at the center of rotation of the auger gear 162. The rear wall 1022 of the container body 102 includes a bearing hole 109 (see FIG. 8) into which the coupling shaft 164 is rotatably inserted. The coupling shaft 164 is inserted into the bearing hole 109 in a state where a seal ring 166 is attached. The coupling shaft 164 is connected to the coupling portion 133 of the rotation shaft 1301 of the auger 130.

Figure 8:
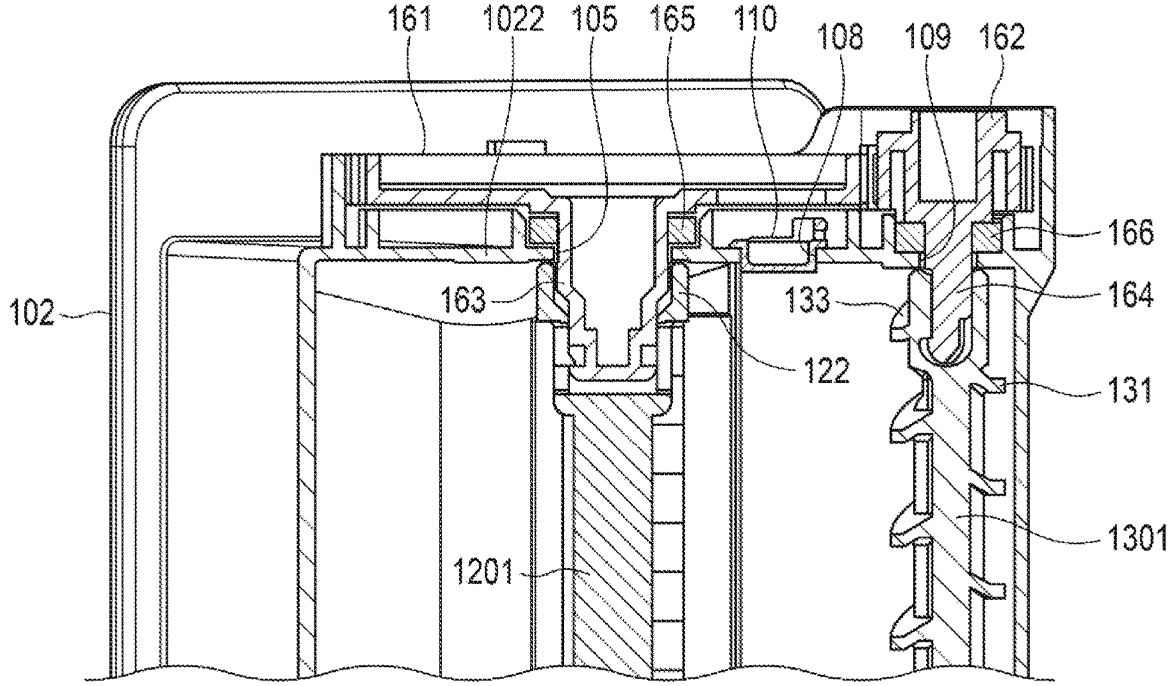
FIG. 8 is a cross-sectional view illustrating a rear end of the toner cartridge.
Figure 12:
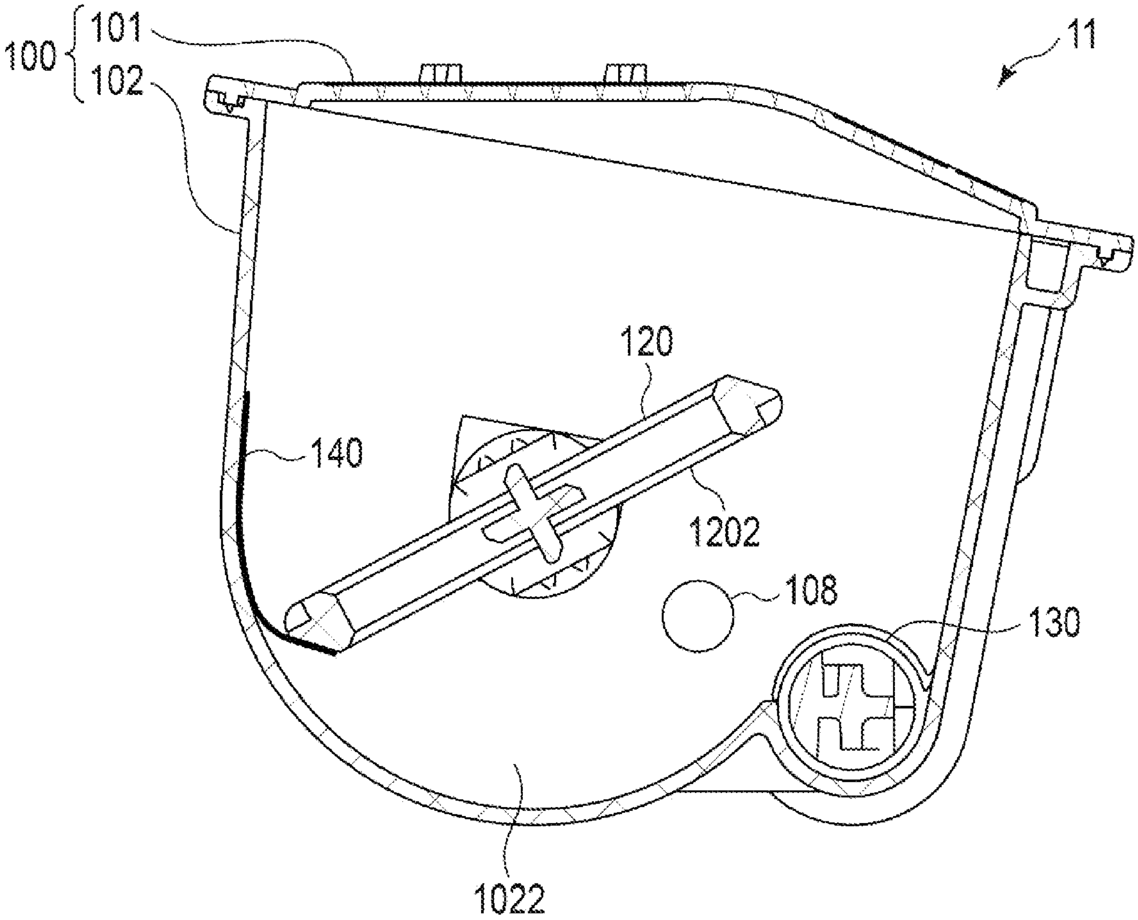
FIG. 12 is a front cross-sectional view of the rear wall of the toner cartridge.

The ventilation port 108 for cleaning is located between the two bearing holes 105 and 109 (see FIGS. 8 and 12). Further, the paddle gear 161 overlaps the ventilation port 108 when viewed from the longitudinal direction of the toner cartridge 11 (see FIG. 8). Therefore, the plug 110 that covers the ventilation port 108 has a protruding height so as not to interfere with the paddle gear 161 in a state where the ventilation port 108 is sealed.

Here, the procedure for assembling the above-described toner cartridge 11 will be described.

When assembling the toner cartridge 11, first, a supply port provided in the supply unit 103 of the container body 102 is sealed by the sealing material 106, and the shutter 107 is attached to the supply unit 103. Further, the plug 110 is attached to the ventilation port 108 provided in the rear wall 1022 of the container body 102 to seal the ventilation port 108.

Then, the paddle 120 and the auger 130 are set in the container body 102. At this time, the front end 132 of the rotation shaft 1301 of the auger 130 is inserted into the bearing portion 1031 provided in the supply unit 103 of the container body 102, and the auger 130 is put into the container body 102. Further, the front end 121 of the rotation shaft 1201 of the paddle 120 is inserted into the bearing portion 151 provided on the front wall 1021 of the container body 102 from the inside, and the paddle 120 is put into the container body 102.

Next, the gear unit 160 is attached to the outside of the rear wall 1022 of the container body 102. At this time, the seal ring 165 is attached to the coupling shaft 163 of the paddle gear 161, and the coupling shaft 163 is inserted into the bearing hole 105 of the rear wall 1022 of the container body 102. Then, the coupling shaft 163 of the paddle gear 161 is inserted into the coupling portion 122 provided at the rear end of the rotation shaft 1201 of the paddle 120 and is coupled therewith. In addition, the seal ring 166 is attached to the coupling shaft 164 of the auger gear 162, the auger gear 162 is engaged with the paddle gear 161, and the coupling shaft 164 of the auger gear 162 is inserted into the bearing hole 109 of the rear wall 1022 of the container body 102. Further, the coupling portion 133 provided at the rear end of the rotation shaft 1301 of the auger 130 and the coupling shaft 164 of the auger gear 162 are coupled.

Finally, the lid body 101 is set so as to close the opening 1023 of the container body 102, and the container body 102 and the lid body 101 are thermally welded to each other along the entire periphery of the opening 1023. When the toner is filled in the toner cartridge 11 assembled as described above, the toner is filled from the filling port 104 of the front wall 1021 of the container body 102, and the cap 150 is attached to the filling port 104 to seal the filling port 104.

Next, a cleaning procedure that enables reusing of the toner cartridge 11 after the toner is exhausted will be described.

When cleaning the toner cartridge 11, first, the cap 150 is removed from the filling port 104 of the toner container 100, the plug 110 is removed from the ventilation port 108, and the shutter 107 is removed from the supply unit 103.

Figure 4:
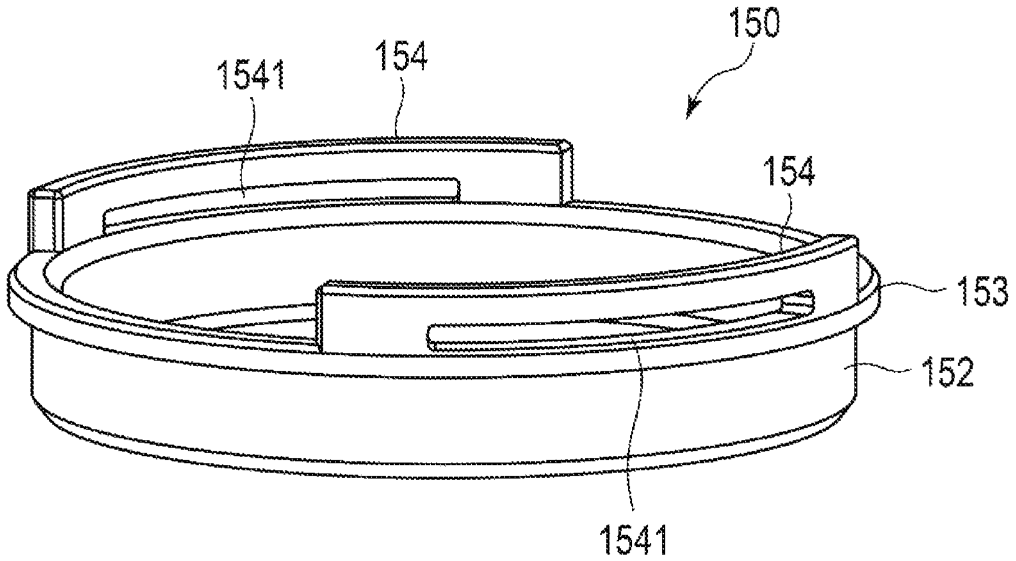
FIG. 4 is an external perspective view showing a cap for sealing a filling port of the toner cartridge.

As shown in FIG. 4, the cap 150 for sealing the filling port 104 has a press-fitting portion 152, a flange portion 153, and two protruding portions 154 that are integrally and coaxially formed. The cap 150 can be formed of, for example, an elastically deformable material such as a solid synthetic resin or rubber.

The press-fitting portion 152 is press-fitted into the filling port 104 when the cap 150 is attached to the filling port 104, and has a substantially cylindrical shape having a diameter slightly larger than an inner diameter of the filling port 104. The flange portion 153 engages with an outer edge of the filling port 104 in a state in which the press-fitting portion 152 is press-fitted into the filling port 104, and has an annular shape having a larger diameter than the press-fitting portion 152. The two protruding portions 154 have an arcuately curved shape, are radially spaced apart from each other in the flange portion 153, and project forward from the front surface of the flange portion 153. Each protruding portion 154 has an arcuate groove 1541 for hooking a tool to remove the cap 150 (not shown).

When the cap 150 is removed, the tool is hooked into the groove 1541 from the inside of the two protruding portions 154, and then the cap 150 is pulled out from the filling port 104. The diameter of the press-fitting portion 152, the thickness of the flange portion 153, and the like are sizes that do not allow the cap 150 to be easily removed from the filling port 104 without using the tool or the like.

Figure 5:
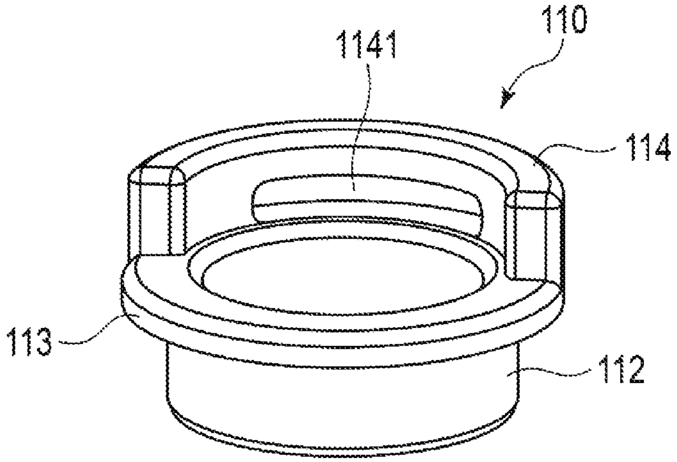
FIG. 5 is an external perspective view illustrating a plug for sealing a ventilation port of the toner cartridge.

As shown in FIG. 5, the plug 110 for sealing the ventilation port 108 integrally and coaxially includes a press-fitting portion 112, a flange portion 113, and a protruding portion 114. The press-fitting portion 112 may have a diameter to fit tightly into the ventilation port 108. The flange portion 113 may have a diameter larger than the press-fitting portion 112 and the ventilation port 108. The plug 110 can be formed of an elastically deformable material such as a solid synthetic resin or rubber, for example.

The press-fitting portion 112 is press-fitted into the ventilation port 108 when the plug 110 is attached to the ventilation port 108, and has a substantially cylindrical shape having a diameter slightly larger than an inner diameter of the ventilation port 108. The flange portion 113 engages with an outer edge of the ventilation port 108 in a state in which the press-fitting portion 112 is press-fitted into the ventilation port 108, and has an annular shape having a larger diameter than the press-fitting portion 112. The protruding portion 114 has an arc-shaped curved shape and protrudes forward from the front surface of the flange portion 113. The protruding portion 114 has an arcuate groove 1141 for hooking a tool to remove the plug 110 (not shown).

When the plug 110 is removed, the tool is hooked in the groove 1141 from the inside of the protruding portion 114, and then the plug 110 is pulled out from the ventilation port 108. The diameter of the press-fitting portion 112, the thickness of the flange portion 113, and the like are sizes that do not allow the plug 110 to be easily removed from the ventilation port 108 without using the tool or the like.

Figure 6:
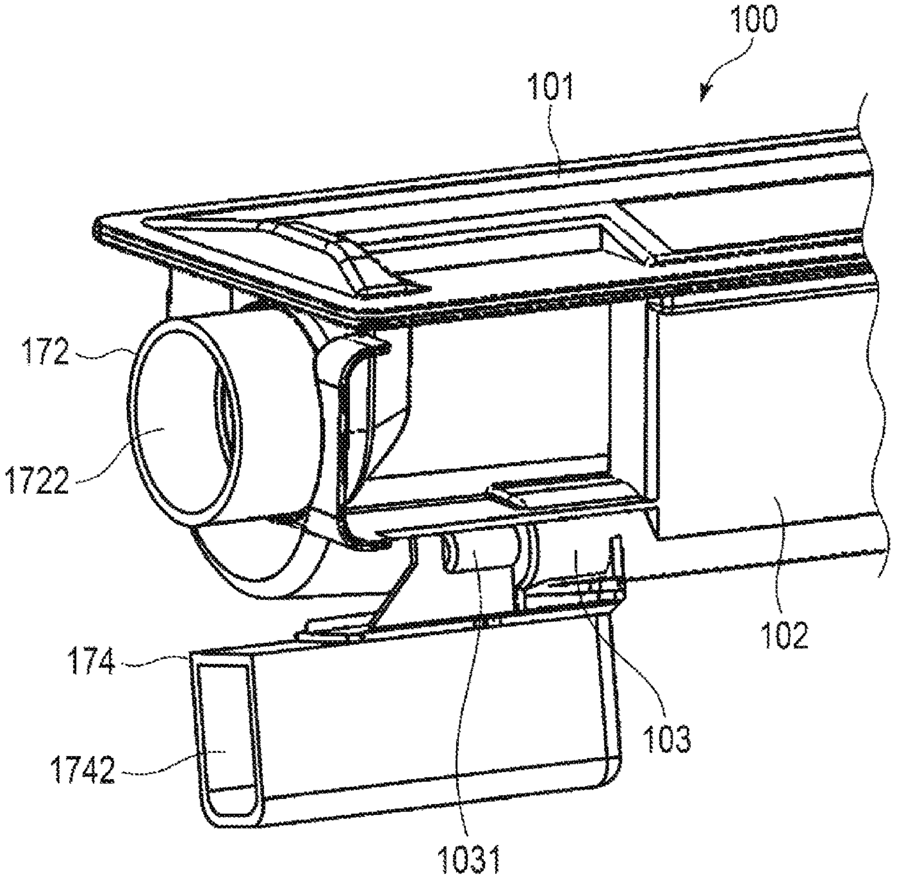
FIG. 6 is a perspective view showing two adaptors attached to the filling port and the ventilation port of the toner cartridge.

After the cap 150 is removed, as shown in FIG. 6, an adapter 172 for suction is attached to the filling port 104. After the shutter 107 is removed, the adapter 174 is attached to the supply unit 103. FIG. 6 shows a state in which the adapter 172 is attached to the filling port 104 and the adapter 174 is attached to the supply unit 103.

Figure 7:
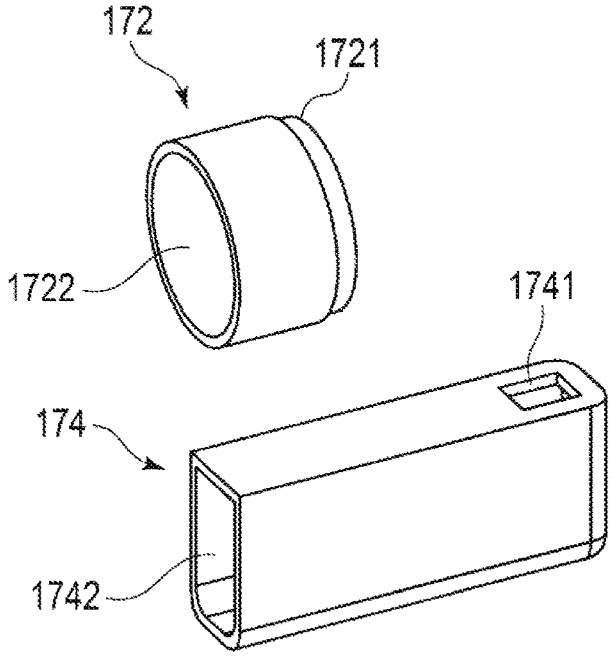
FIG. 7 is an external perspective view showing the two adapters.

As shown in FIG. 7, the adapter 172 attached to the filling port 104 has a substantially cylindrical shape, and has a fitting portion 1721 fitted to the filling port 104 at one end of the adapter 172 in the axial direction. The outer diameter of the fitting portion 1721 is substantially the same as the inner diameter of the filling port 104. The adapter 174 attached to the supply unit 103 has a substantially rectangular tube shape, and has a rectangular communication hole 1741 that communicates with the supply port of the supply unit 103 at one end of a side surface of the adapter 174 in the longitudinal direction.

The adapter 172 has, at its other end, a circular suction opening 1722 for connecting an air-intake device such as a blower (not shown). The adapter 174 has, at the end in the longitudinal direction where the communication hole 1741 is not disposed, a substantially rectangular suction opening 1742 for connecting an air-intake device such as a blower (not shown). Between each of the suction openings 1722 and 1742 and the intake device, a toner collection container (not shown) for collecting the sucked toner is disposed.

As described above, the plug 110 for sealing the ventilation port 108 overlaps the paddle gear 161 when viewed from the axial direction thereof. That is, as shown in FIG. 8, the ventilation port 108 to which the plug 110 is attached overlaps with a region where the paddle gear 161 is projected onto the rear wall 1022 of the container body 102 of the toner container 100. Therefore, the plug 110 is normally covered and hidden by the paddle gear 161 and is not visible from the rear of the toner container 100.

Figure 9:
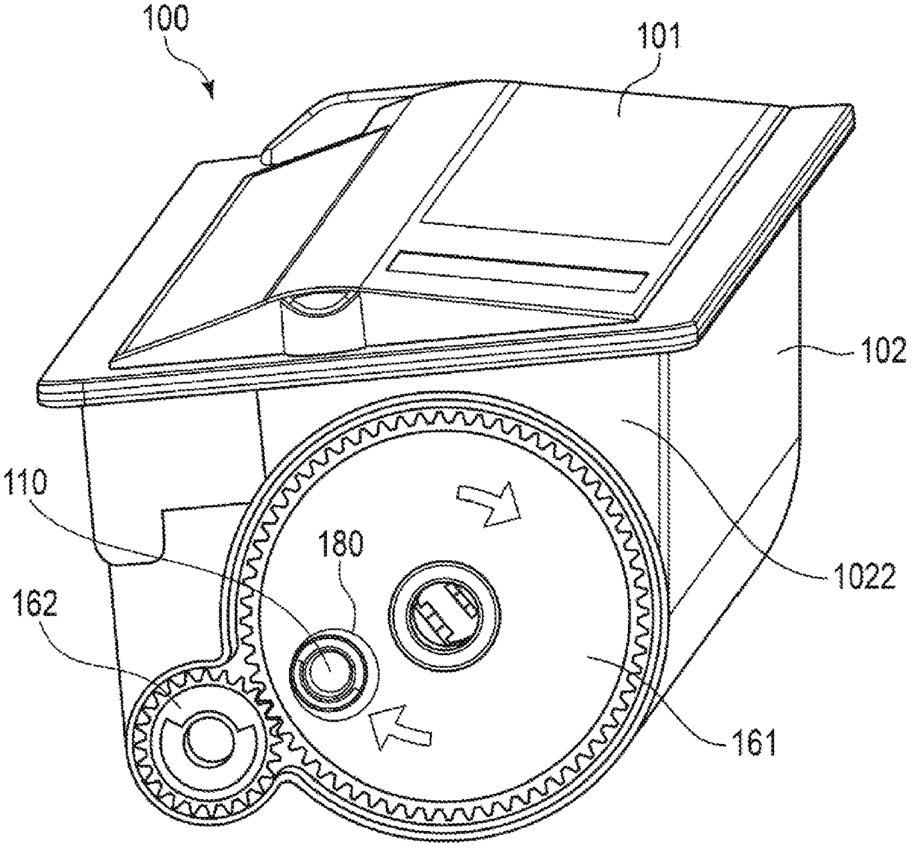
FIG. 9 is an external perspective view of the toner cartridge viewed from the obliquely rear side.

In the present embodiment, in order to make the plug 110 accessible from the rear side of the toner container 100, the paddle gear 161 is provided with a through hole 180 shown in FIG. 9. The through hole 180 is located at a position deviated from the center of the paddle gear 161 such that the through hole 180 overlaps the ventilation port 108 of the toner container 100 when the paddle gear 161 rotates by a certain degree, when viewed from the rear side of the paddle gear 161. The through hole 180 has a diameter larger than an inner diameter of the ventilation port 108 of the toner container 100 to which the plug 110 is attached. Of course, the plug 110 has a size that can be inserted into the through hole 180 of the paddle gear 161. The diameter of the through hole 180 may be larger than the diameter of the flange portion 113 of the plug 110.

Therefore, to remove the plug 110, the paddle gear 161 is rotated to the position shown in FIG. 9 so that the through hole 180 aligns with the ventilation port 108 along the rotation axis of the paddle gear 161. Then, a tool (not shown) is inserted through the through hole 180, and is hooked in the groove 1141 of the protruding portion 114 of the plug 110 to pull out the plug 110 from the ventilation port 108.

Figure 10:
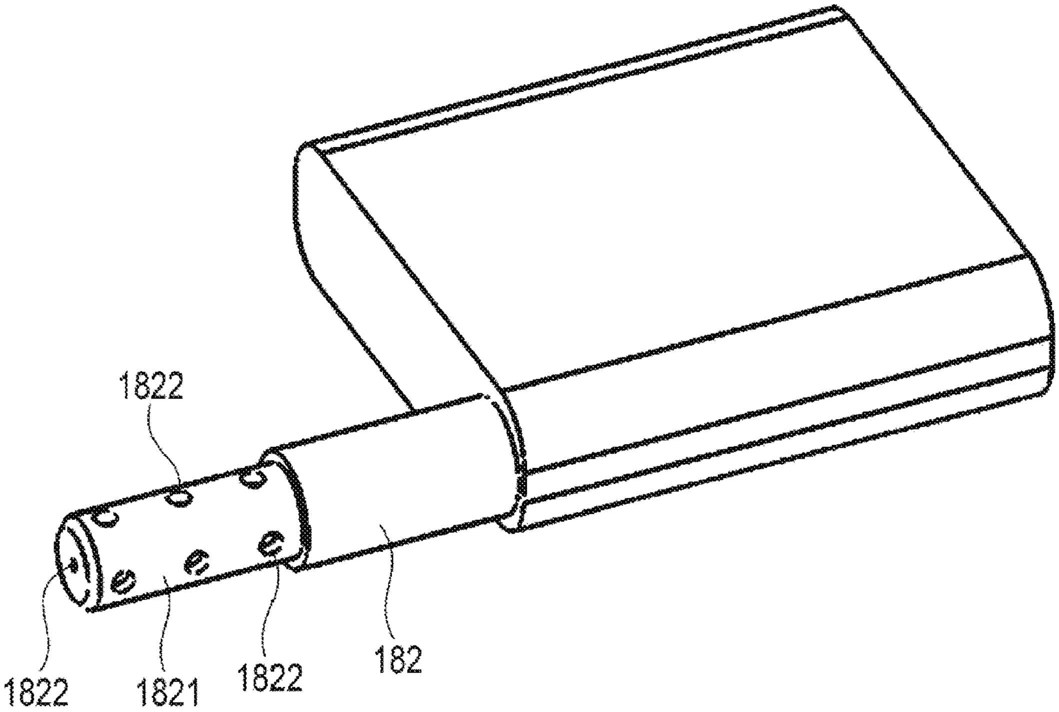
FIG. 10 is an external perspective view illustrating an air supply nozzle attached to the ventilation port of the toner cartridge.

Further, in order to supply the outside air into the toner container 100 through the ventilation port 108, an air supply nozzle 182 shown in FIG. 10 is inserted into the through hole 180 and the ventilation port 108 of the paddle gear 161 that overlap when viewed from the rear side of the paddle gear 161. A pump (not shown) or the like for feeding the outside air in a compressed state is connected to the air supply nozzle 182.

Figure 11:
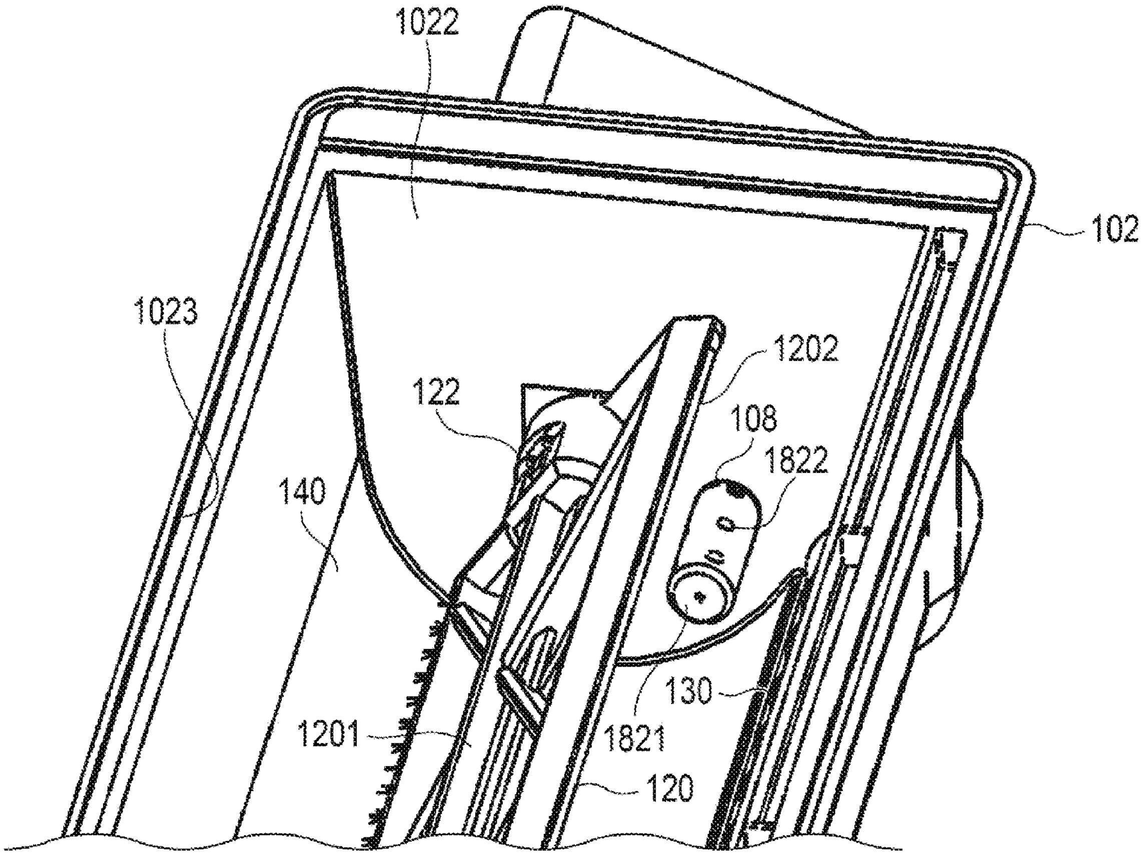
FIG. 11 is an external perspective view of the air supply nozzle attached to the ventilation port of the toner cartridge as viewed from the inside of the toner container.

As shown in FIG. 11, a tip 1821 of the air supply nozzle 182 protrudes from the rear wall 1022 of the container body 102 into the toner container 100. The tip 1821 of the air supply nozzle 182 has a substantially cylindrical shape, and has a plurality of air supply holes 1822 in a peripheral portion thereof. Therefore, when the outside air is fed into the toner container 100 using the air supply nozzle 182, the compressed air is ejected in the radial direction from the tip end of the air supply nozzle 182 through the plurality of air supply holes 1822. As a result, air can be blown toward the inner surface of the rear wall 1022 of the container body 102, and toner adhering to the inner surface of the rear wall 1022 can be removed.

Further, in the present embodiment, as shown in FIG. 12, since the ventilation port 108 through which the tip 1821 of the air supply nozzle 182 is inserted is provided between the bearing hole 105 into which the coupling shaft 163 of the paddle gear 161 is inserted and the bearing hole 109 into which the coupling shaft 164 of the auger gear 162 is inserted, the air ejected through the plurality of air supply holes 1822 of the air supply nozzle 182 can be blown near the rear end of the paddle 120 and near the rear end of the auger 130. Accordingly, the toner adhering near the rear end of the paddle 120 and the toner adhering near the rear end of the auger 130 can be effectively cleaned.

As shown in FIG. 11, the tip 1821 of the air supply nozzle 182 protrudes inward from the rear wall 1022 of the container body 102. Therefore, when the paddle 120 is stopped at a position where the stirring blade 1202 of the paddle 120 covers the ventilation port 108, the tip 1821 of the air supply nozzle 182 interferes with the stirring blade 1202, and the air supply nozzle 182 cannot be mounted. Therefore, in the present embodiment, in the state shown in FIG. 9 in which the through hole 180 of the paddle gear 161 coaxially overlaps the ventilation port 108 of the container body 102, the paddle 120 and the paddle gear 161 are connected and coupled so that the rotational position of the paddle 120 and the position of the ventilation port 108 have the positional relationship as shown in FIGS. 11 and 12. As a result, the tip 1821 of the air supply nozzle 182 can be inserted into the air ventilation port 108 without being interfered with the stirring blade 1202.

Further, in the present embodiment, the paddle 120 and the paddle gear 161 are aligned and connected so that the stirring blade 1202 of the paddle 120 is stopped at the position as shown in FIGS. 11 and 12 when the through hole 180 of the paddle gear 161 is overlapped with the ventilation port 108. Therefore, the free end edge of the scraping member 140 can be stopped in a state of being pressed against the inner surface of the container body 102 on the side away from the auger 130. As a result, when the air is ejected through the plurality of air supply holes 1822 of the tip 1821 of the air supply nozzle 182, it is possible to prevent the scraping member 140 from being deformed by ethe air.

As described above, according to the present embodiment, in the case where the plug 110 for sealing the ventilation port 108 is removed for cleaning, it is necessary to rotate the paddle gear 161 so that the through hole 180 overlaps with the ventilation port 108. Therefore, it is possible to prevent the plug 110 of the ventilation port 108 from being inadvertently removed.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

For example, although one through hole 180 is provided in the paddle gear 161 in the above-described embodiment, two or more through holes may be provided in the paddle gear 161 that overlap with the ventilation port 108 of the container body 102 if the paddle gear 161 rotates by a certain degree when viewed from the rear side thereof. Further, in this case, a plurality of ventilation ports communicating with the plurality of through holes of the paddle gear 161 may be provided in the rear wall 1022 of the container body 102, and a plurality of air supply nozzles 182 may be attached.

Further, in the above-described embodiment, the cap 150 for sealing the filling port 104 of the toner container 100 and the plug 110 for sealing the ventilation port 108 of the toner container 100 are mounted by press-fitting, but may be fixed by, for example, a screw type or fixed by an engaging claw.

What is claimed is:

1. A toner cartridge for storing toner to be supplied to an image forming apparatus, comprising:

a container in which the toner is stored and including:

a first wall having a filling port through which the toner can be filled, and a second wall having a ventilation port that is sealable by a plug, wherein the plug seals the ventilation port during operation of the toner cartridge and is removed during maintenance of the toner cartridge to enable air to be supplied into the container through the ventilation port;

a paddle configured to rotate to stir the toner between the first and second walls of the container; and a paddle gear connected to the paddle and through which a rotation force is transmitted to the paddle, wherein the paddle gear has a through hole that aligns with the ventilation port in a first direction parallel to a rotation axis of the paddle gear when the paddle gear is at a predetermined rotational position.

2. The toner cartridge according to claim 1, wherein the second wall is located between the first wall and the paddle gear, and the through hole has a diameter that is large enough for the plug to pass therethrough.

3. The toner cartridge according to claim 1, wherein the plug protrudes toward a surface of the paddle gear facing the second wall so as not to reach the surface when sealing the ventilation port.

4. The toner cartridge according to claim 1, further comprising:

an auger including a screw blade and configured to rotate between the first and second walls to feed the toner towards a supply port of the container through which the toner is supplied to the image forming apparatus; and an auger gear connected to the auger across the second wall and through which a rotation force is transmitted to the auger, wherein the ventilation port is between the rotation axis of the paddle gear and a rotation axis of the auger gear.

5. The toner cartridge according to claim 4, wherein the paddle gear engages with the auger gear.

6. The toner cartridge according to claim 1, further comprising:

a scraper that is attached to the paddle and can contact an inner surface of the container, wherein when the through hole aligns with the ventilation port in the first direction, the scraper contacts the inner surface of the container.

7. The toner cartridge according to claim 1, further comprising:

a cap by which the filling port is sealable.

8. The toner cartridge according to claim 7, wherein the cap has a cylindrical shape and has a groove at one end thereof that protrudes from the first wall of the container when the cap seals the filling port, the groove extending along a side surface of the cap.

9. The toner cartridge according to claim 1, wherein the plug has a cylindrical shape and has a groove at one end thereof that protrudes from the second wall of the container when the plug seals the ventilation port, the groove extending along a side surface of the plug.

10. The toner cartridge according to claim 1, wherein the paddle has a rectangular shape and is rotatable around a rotation axis that extends between two longitudinal sides thereof, and when the through hole aligns with the ventilation port in the first direction, no portion of the paddle overlaps the through hole or the ventilation port in the first direction.

11. An image forming apparatus, comprising:

an image forming unit configured to form an image of toner on a belt;

a fixing device configured to fix on a sheet the image transferred through the belt; and a toner cartridge including:

a container in which the toner is stored and including:

a first wall having a filling port through which the toner can be filled, and a second wall having a ventilation port that is sealable by a plug, wherein the plug seals the ventilation port during operation of the toner cartridge and is removed during maintenance of the toner cartridge to enable air to be supplied into the container through the ventilation port, a paddle configured to rotate to stir the toner between the first and second walls of the container, and a paddle gear connected to the paddle and through which a rotation force is transmitted to the paddle, wherein the paddle gear has a through hole that aligns with the ventilation port in a first direction parallel to a rotation axis of the paddle gear when the paddle gear is at a predetermined rotational position.

12. The image forming apparatus according to claim 11, wherein the second wall is located between the first wall and the paddle gear, and the through hole has a diameter that is large enough for the plug to pass therethrough.

13. The image forming apparatus according to claim 11, wherein the lid protrudes toward a surface of the paddle gear facing the second wall so as not to reach the surface when sealing the ventilation port.

14. The image forming apparatus according to claim 11, wherein the toner cartridge further includes:

an auger including a screw blade and configured to rotate between the first and second walls to feed the toner towards a supply port of the container through which the toner is supplied to the image forming unit, and an auger gear connected to the auger across the second wall and through which a rotation force is transmitted to the auger, and the ventilation port is between the rotation axis of the paddle gear and a rotation axis of the auger gear.

15. The image forming apparatus according to claim 14, wherein the paddle gear engages with the auger gear.

16. The image forming apparatus according to claim 11, wherein the toner cartridge further includes a scraper that is attached to the paddle and can contact an inner surface of the container, and when the through hole aligns with the ventilation port in the first direction, the scraper contacts the inner surface of the container.

17. The image forming apparatus according to claim 11, wherein the toner cartridge further includes a cap by which the filling port is sealable.

18. The image forming apparatus according to claim 17, wherein the cap has a cylindrical shape and has a groove at one end thereof that protrudes from the first wall of the container when the cap seals the filling port, the groove extending along a side surface of the cap.

19. The image forming apparatus according to claim 11, wherein the lid has a cylindrical shape and has a groove at one end thereof that protrudes from the second wall of the container when the lid seals the ventilation port, the groove extending along a side surface of the lid.

20. The image forming apparatus according to claim 11, wherein the paddle has a rectangular shape and is rotatable around a rotation axis that extends between two longitudinal sides thereof, and when the through hole aligns with the ventilation port in the first direction, no portion of the paddle overlaps the through hole or the ventilation port in the first direction.

* * * * *